(No Model.)

O. GEHRICKE.
CHILD'S CYCLE.

No. 501,501.        Patented July 18, 1893.

WITNESSES:
Marion Hall
H Willard Griffiths

INVENTOR
O. Gehricke
by
Guepel & Rueguer
ATTORNEYS.

UNITED STATES PATENT OFFICE.

OTTO GEHRICKE, OF HEIDELBERG, GERMANY.

CHILD'S CYCLE.

SPECIFICATION forming part of Letters Patent No. 501,501, dated July 18, 1893.

Application filed February 23, 1893. Serial No. 463,433. (No model.)

*To all whom it may concern:*

Be it known that I, OTTO GEHRICKE, a subject of the King of Prussia, and a resident of Heidelberg, in the Kingdom of Prussia and German Empire, have invented a new and useful Child's Cycle with a Horse, of which the following is a specification.

This invention relates to an improved recreation apparatus for children, and consists of a novel construction of velocipede combined with the figure of a horse adapted to imitate a horse's galloping action, which apparatus, in addition to the healthful exercise of cycling, also affords the user a source of amusement.

Figure 1:
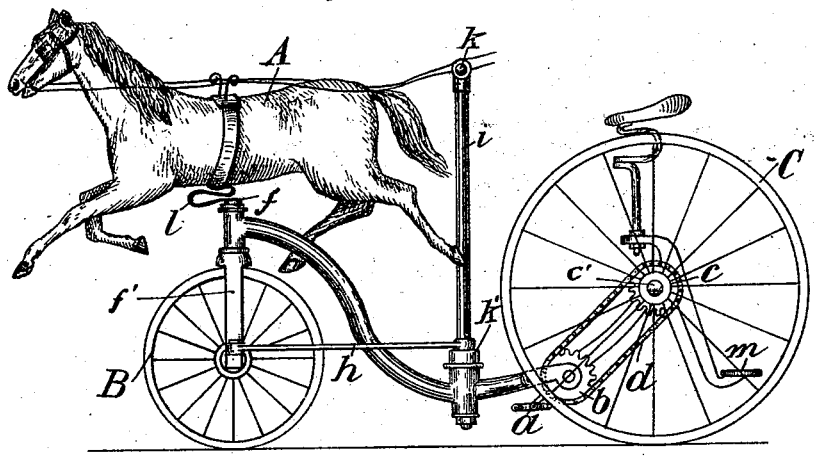
Figure 2:
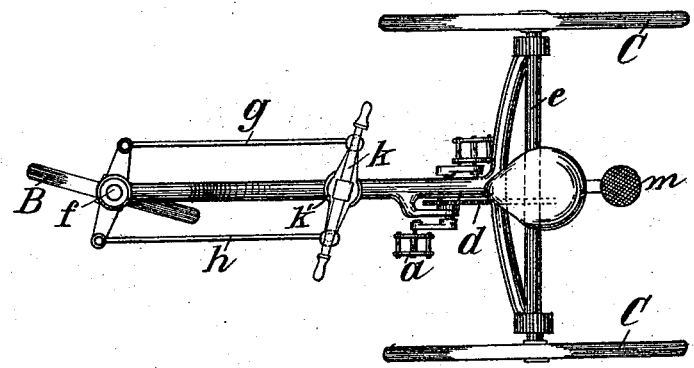

In the annexed drawings, Figure 1 represents a side-elevation of my improved children's cycle, and Fig. 2 is a plan of the same.

Similar letters of reference indicate corresponding parts.

The velocipede is propelled through the medium of the pedals $a$, sprocket wheels $b$ and $c$, and the chain $d$, in the ordinary way, the sprocket wheel $c$ being mounted upon the axle $c'$ of the rear driving wheels C. The front or steering wheel B is of comparatively small diameter, so as to allow for the figure of a horse A being mounted above it. The horse A is mounted upon a spring $l$ which is carried by the pivot $f$ of the wheel B. The motion produced by the inequalities of the surface over which the velocipede is propelled is communicated to the horse by the spring $l$, and thus imparts to it an action similar to the action of a galloping horse.

In order that the legs of the user may not come into contact with the hind legs of the horse, it is necessary that the front wheel B should be a sufficient distance in advance of the rear wheels C, which of course necessitates the use of a special form of steering gear. For this purpose the fork $f'$ of the steering wheel is connected with a corresponding cross bar $k'$ on the lower extremity of the standard $i$ by the rods $g, h$, which together form a parallel motion. The standard $i$ is journaled in the back bone of the velocipede, and carries upon its upper extremity the handle bar $k$, to which the reins of the horse are led. The velocipede is provided with a step $m$ to assist the user in mounting, and for the accommodation of a passenger.

Having thus described my invention, what I claim as new, and desire to secure by Letters Patent, is—

1. The combination, with a tricycle, of the body of a horse mounted by means of a spring on the pivot of the front steering wheel, substantially as set forth.

2. The combination, with a back bone, of a driving shaft, driving wheels on the shaft, pedals and means for rotating said shaft from the pedals, a steering wheel on the front end of the back bone, a horse mounted by means of a spring on the upper end of the pivot of the steering wheel, a vertical standard journaled on the back bone back of the horse, a handle bar on the upper end of said standard, and rods connecting arms of the standard with arms of the steering wheel fork, substantially as set forth.

In witness whereof I hereunto set my hand in presence of two witnesses.

OTTO GEHRICKE.

Witnesses:
GOTTF. MENZ,
PH. BALLIO.